United States Patent [19]
Obayashi et al.

[11] Patent Number: 4,686,135
[45] Date of Patent: Aug. 11, 1987

[54] COMPOSITE SHEET MATERIAL

[75] Inventors: Tsutomu Obayashi, Tokyo; Kazuhide Ino, Souka; Yoshiji Hiraoka, Musashino; Saburo Baba, Nagareyama, all of Japan

[73] Assignee: Hiraoka & Co., Ltd., Tokyo, Japan

[21] Appl. No.: 798,112

[22] Filed: Nov. 14, 1985

[30] Foreign Application Priority Data

| Jan. 29, 1985 | [JP] | Japan | 60-13445 |
| Feb. 14, 1985 | [JP] | Japan | 60-25240 |
| Jun. 4, 1985 | [JP] | Japan | 60-119671 |
| Jun. 4, 1985 | [JP] | Japan | 60-119672 |
| Jun. 28, 1985 | [JP] | Japan | 60-140412 |
| Jun. 29, 1985 | [JP] | Japan | 60-141523 |
| Aug. 12, 1985 | [JP] | Japan | 60-175655 |
| Aug. 12, 1985 | [JP] | Japan | 60-175656 |
| Aug. 12, 1985 | [JP] | Japan | 60-175657 |
| Aug. 17, 1985 | [JP] | Japan | 60-180039 |
| Aug. 20, 1985 | [JP] | Japan | 60-181076 |
| Aug. 28, 1985 | [JP] | Japan | 60-187178 |

[51] Int. Cl.$^4$ .............................. B32B 7/00; C09J 5/02
[52] U.S. Cl. ................................. 428/265; 428/266; 428/267; 428/268; 428/271; 428/365; 428/367; 428/379; 428/408; 428/414; 428/421; 428/443; 428/447; 428/; 428/424.4; 428/920; 428/524; 428/518; 428/483; 428/476.3; 156/306.9; 427/34; 427/41
[58] Field of Search ............... 428/421, 408, 266, 443, 428/267, 447, 268, 414, 271, 424.4, 365, 367, 379, 920; 156/306.9

[56] References Cited

U.S. PATENT DOCUMENTS

| 4,286,013 | 8/1981 | Daroga et al. | 428/447 |
| 4,308,197 | 12/1981 | Byrd et al. | 428/447 |
| 4,312,693 | 1/1982 | Salensky et al. | 428/447 |
| 4,341,841 | 7/1982 | Ohno et al. | 428/447 X |
| 4,409,275 | 10/1983 | Samowich | 428/908.8 |

*Primary Examiner*—P. C. Ives
*Attorney, Agent, or Firm*—Benasutti and Murray

[57] ABSTRACT

A stainproof, flame-resistant composite sheet material including at least one silicone polymer layer containing a silicone resin or rubber and optionally a flame-resistant inorganic filler and at least one stainproof surface layer containing at least one synthetic thermoplastic stain-resistant, weathering-resistant polymeric material, the silicone polymer layer and the stainproof surface layer being bonded optionally through an adhesive material, a cold plasma or corona discharge-modified surface portion of the silicone polymer layer or a cold plasma or corona discharge-modified and graft polymerization-modified surface portion of the silicone polymer layer.

20 Claims, 6 Drawing Figures

COMPOSITE SHEET MATERIAL

BACKGROUND OF THE INVENTION

1. Field of the Invention

The present invention relates to a composite sheet material. More particularly, the present invention relates to a stainproof composite sheet material having enhanced heat resistance, weathering resistance, and waterproofness.

2. Description of the Related Art

Sheet materials containing a synthetic resin coating layer are used in various industrial fields, for example, housing, civil construction, interior decoration, automobiles, aircraft, and boats. However, conventional synthetic resins for coating the sheet materials, for example, polyvinyl chloride, are disadvantageous in that when the resins are heated at a high temperature, they burn and give off large amounts of harmful or toxic gas and smoke are generated. Various attempts have been made to make the conventional resins noncombustible or fire retardant. For example, Japanese Examined Patent Publication (Kokoku) No. 55-4582 discloses a fire-retardant sheet material comprising a fibrous substrate and a coating layer consisting of a polyvinyl chloride resin mixed with a mixture of a borate, a zinc compound, or iron compound with aluminum hydroxide or barium sulfate. However, the resultant fire-retardant property of the sheet material is not always satisfactory.

In another example, Japanese Examined Patent Publication (Kokoku) Nos. 53-13505 and 51-37397 and Japanese Unexamined Patent Publication (Kokai) No. 54-68470 disclose attempts to use silicone resins or rubbers as a fire-retardant resin. In these attempts, the resultant fire-retardant property of the sheet material is considerably high. However, utilization of silicone resins or rubbers has the disadvantage that the coating layer, which is soft and delicate, is easily stained by oily dusts or solid dusts or sometimes peels when the sheet material is used in the open air.

Accordingly, it is important to eliminate the above-mentioned disadvantage from silicone resin or rubber-coated sheet materials.

SUMMARY OF THE INVENTION

An object of the present invention is to provide a composite sheet material having an enhanced fire-retardant property and stainproof property.

Another object of the present invention is to provide a composite sheet material in which a fire-retardant layer is covered with and is firmly bonded to a stainproof layer.

The above-mentioned objects are accomplished by the composite sheet material of the present invention, which comprises (A) at least one silicone polymer layer containing at least one member selected from the group consisting of silicone resins and silicone rubbers and (B) at least one stainproof surface layer containing at least one synthetic thermoplastic polymeric material having high stain-resistance and weathering resistance, which stainproof surface layer is laminated on the silicone polymer layer.

The silicone polymer layer may have a surface portion thereof modified by applying a cold plasma treatment or corona discharge treatment thereto to enhance the adhesion property. The modified surface portion of the silicone polymer layer is optionally further modified by applying thereto a graft polymerization treatment with ethylene imine, acrylic acid, and/or acrylamide to further enhance the adhesion property.

DESCRIPTION OF THE PREFERRED EMBODIMENTS

The composite sheet material of the present invention comprises at least one silicone polymer layer and at least one stainproof surface layer laminated on the silicone polymer layer.

Figure 1:
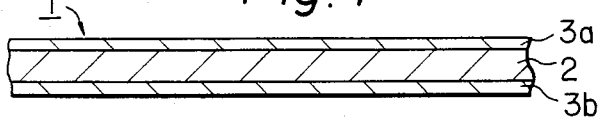
FIG. 1 is an explanatory cross-sectional profile of an embodiment of the composite sheet material of the present invention.

For example, referring to FIG. 1, a composite sheet material 1 is composed of a silicone polymer layer 2 and two stainproof surface layers 3a and 3b laminated on the upper and lower surfaces of the silicone polymer layer 2, respectively. In the composite sheet material of the present invention, it is, of course, also possible to coat just one surface of the silicone polymer layer with the stainproof surface layer. The silicone polymer layer contains at least one member selected from the group consisting of silicone resins and silicone rubbers.

The silicone resins usable for the present invention include organopolysiloxanes, polyacryloxyalkylalkoxysilanes, polyvinylsilanes, polysilthiane, polysilazane, carbon polymers having a silicone-containing side chain, and polysilanes. For example, fire-retardant silicone resins KR166, KR168, KR202, KR2023, and KR-101-10 (trademarks of silicone resins made by Shinetsu Kagaku) are useful for the present invention.

The silicone resins as mentioned above may be converted to corresponding silicone rubbers by applying thereto a cross-linking (hardening or vulcanizing) agent.

The organopolysiloxane resins usable for the present invention are preferably provided with at least one organic substituent selected from vinyl, aryl, hydroxyl, alkoxyl having 1 to 4 carbon atoms, amino, and mercapto radicals and are preferably selected from the group consisting of polydimethylsiloxane resins, polydiphenylsiloxane resins, polymethylphenyl-siloxane resins, and copolymer resins of the above-mentioned substituted silanes.

The polyacryloxyalkylalkoxysilane resins usable for the present invention include copolymers of at least one acryloxyalkylalkoxysilane of the general formula:

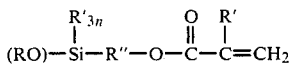

wherein R represents a monovalent hydrocarbon radical having 1 to 10 carbon atoms, R' represents a member selected from a hydrogen atom and monovalent hydrocarbon radicals having 1 to 10 carbon atoms, R" represents bivalent hydrocarbon radicals having 2 to 10 carbon atoms, and n represents an integer of 1 to 3, with at least one ethylenically unsaturated monomer.

The polyvinylsilane resins usable for the present invention include copolymers of at least one vinylsilane compound of the general formula:

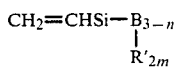

wherein B represents a radical —OR' or —OR"—OR', and R', R" and n are the same as defined above, with at least one ethylenically unsaturated monomer.

The above-mentioned ethylenically unsaturated monomer may be copolymerized in an amount of 1% to 50% of weight with the silane compounds. The ethylenically unsaturated aliphatic monomer is preferably selected from styrene, methylstyrene, dimethylstyrene, ethylstyrene, chlorostyrene, bromostyrene, fluorostyrene, nitrostyrene, acrylic acid, methacrylic acid, methyl acrylate, ethyl acrylate, butyl acrylate, methyl methacrylate, ethyl methacrylate, butyl methacrylate, acrylamide, 2-hydroxyethyl acrylate, 2-hydroxyethyl acrylate, acrylonitrile, methacrylonitrile, 2-chloroacrylonitrile, vinyl acetate, vinyl chloroacetate, vinyl butylate, vinyl chloride, vinyl bromide, vinyl fluoride, vinylidene chloride, vinyl halogen compounds, and vinyl ether compounds.

The silicone resins may be modified with an epoxy compound, polyester, alkyl resin, and/or amino resin or with a fatty acid.

When the sheet material is required to exhibit enhanced self-extinguishing characteristics upon being heated at an elevated temperature, it is preferable that the silicone resin be selected from organopolysiloxane resins, containing at least 70% by weight of a polysiloxane component, and polyacryloxyalkylalkoxysilane and polyvinyl silane resins containing 50% by weight or less, more preferably, 20% by weight or less, of the copolymerized ethylenically unsaturated monomer component.

When the sheet material is required to exhibit a high flex resistance and self-extinguishing characteristics, it is preferable that the silicone resin be selected from non-modified organopolysiloxane resins.

The silicone resins usable for the present invention may be used in the form of solids, flexible pastes, liquids, emulsions, or dispersions at room temperature or in the state of a solution in an organic solvent.

The silicone rubbers usable for the present invention may be selected from room temperature-hardening silicone rubbers, heat-hardening silicone rubber, ultraviolet ray-hardening silicone rubbers, and electron ray-hardening silicone rubbers. The silicone rubbers can be hardened into a three-dimensional network structure by using, as a hardening agent, for example, carboxylic acid salts of zinc, lead, cobalt, and iron; organic tin compounds, for example, dibutyl tin octoate and dibutyl tin laurate; titanium-chelate compounds, for example, tetrapropyl titanate and tetraoctyl titanate; tertiary amine compounds, for example, N,N-dimethyl aniline and triethanol amine; peroxide compounds, for example, benzoyl peroxide, dicumyl peroxide, and t-butyl peroxide; and palladium catalysts.

The silicone polymer layer in the composite sheet material of the present invention may be composed of the silicone resin or rubber alone. Alternatively, the silicone polymer layer can be composed of a mixture of a polymeric matrix consisting of at least one silicone resin or rubber and an additive, for example, an inorganic filler, an inorganic fire-retardant material or incombustible materials, in an amount of 30% to 300%, preferably from 100 to 200% based on the weight of the silicone resin matrix. The inorganic fillers are effective as a reinforcing material for the silicone resin matrix and are preferably selected from titanium dioxide, mica, alumina talc, glass fibers, glass particles, asbestos fibers or particles, silica particles, and clay particles. When the silicone polymer layer should be provided with a smooth surface, it is preferable that the inorganic fillers have a particle size of 50 μm or less.

The fire-retardant inorganic materials include alkali titanates, high refractive inorganic material, and high endothermic inorganic materials.

Alkali titanates are very useful fire-retardant material for enhancing the heat-resistance of the resultant sheet material. Usually, the alkali titanates are used in an amount of 1 to 200 parts, more preferably from 30 to 100 parts, per 100 parts by weight of the silicone resin or rubber matrix.

Alkali titanates are of the general formula:

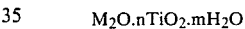

wherein M represents an alkali metal atom, for example, Li, Na, or K, n represents a positive integer of 8 or less, and m represents zero or a positive number of 1 or less.

The alkali titanates include common salt structure alkali titanate, for example, $Li_4TiO_4Li_2TiO_3$, and tunnel structure alkali titanate, for example, $Na_2Ti_7O_{16}$, $K_2Ti_6O_{15}$ or $K_2Ti_8O_{17}$.

The most preferable alkali titanate for enhancing the fire-resistance and heat-insulation of the product of the invention is potassium hexatitanate and its hydrate of the formula:

wherein m represents zero or a positive number of 1 or less.

The alkali titanates, including potassium hexatitanate, are in the form of fine powder or fine fibrous cystals. The preferable alkali titanates for the present invention are in the form of fine fibrous crystals having a length of 5 μm and have an aspect ratio of 20 or more, more preferably 100 or more.

The fibrous potassium titanate crystals have a high specific heat and an excellent heat-insulating property and, therefore, are very preferable for the present invention.

The alkali titanate particles may be surface-treated with 0.05% to 1.0% by weight of a silane coupling agent, for example, γ-aminopropyl triethoxysilane or γ-glycidoxypropyltrimethoxylsilane. The surface-treated alkali titanate is highly effective for enhancing the fire-resistance and heat-insulating property of the silicone polymer layer.

The silicone polymer layer preferably contains at least one inorganic material having high refractive characteristics and/or high endothermic characteristics.

The high refractive inorganic materials exhibit a high interception property for radiant heat, and the endothermic inorganic materials exhibit a high absorption of heat when they are heated at an elevated temperature at which they are heat-decomposed. Therefore, the high refractive inorganic materials and the endothermic materials contained in the silicone polymer layer are effective for preventing the composite sheet material of the present invention from heat decomposition or combustion.

The high refractive inorganic materials preferably have a refractive index of 1.5 or more and a specific gravity of 2.8 or more and are preferably selected from the following inorganic materials.

| Compound | Specific gravity | Refractive index |
| --- | --- | --- |
| Dolomite | 2.8–2.9 | 1.50–1.68 |
| Magnesite | 3.0–3.1 | 1.51–1.72 |
| Aragonite | 2.9–3.0 | 1.63–1.68 |
| Apatite | 3.1–3.2 | 1.63–1.64 |
| Spinel | 3.5–3.6 | 1.72–1.73 |
| Corumdum | 3.9–4.0 | 1.76–1.77 |
| Zircone | 3.9–4.1 | 1.79–1.81 |
| Silicon carbide | 3.17–3.19 | 1.65–2.68 |

The high refractive inorganic materials may be fine powder, grains, fibrous materials, or porous materials consisting of frits, high refractive glass, or solid solution materials of mineral (rock) phosphate.

The endothermic inorganic materials include water of crystallization-releasing inorganic materials, carbon dioxide-releasing inorganic materials, heat-decomposition endothermic inorganic materials, and phase transition endothermic inorganic materials, for example, calcined gypsum, ulum, calcium carbonate, aluminum hydroxide, hydrotalcite type aluminum silicate, and antimony compounds.

The high refractive and/or endothermic inorganic materials, are preferably contained in an amount of 400 parts or less, more preferably from 10 to 300 parts per 100 parts by weight of the silicone resin, so as to replace 25% to 100% by weight of the amount of the alkali titanate therewith.

Also, the high refractive and/or endothermic inorganic materials can be replaced partially or entirely with a conventional inorganic pigment, inorganic bulking filler, or fire-retardant inorganic powder. The amount of the replaced materials is preferably 400 parts by weight or less, more preferably 300 parts by weight or less, per 100 parts by weight of the silicone resin matrix.

The silicone polymer layer is not limited to a specific weight and thickness thereof. However, it is preferable that a single silicone polymer layer preferably have a weight of from 10 to 1000 g/m$^2$, more preferably from 50 to 700 g/m$^2$, and a thickness of from 10 to 500 μm.

The silicone polymer layer of the present invention may optionally contain a dispersing agent, foaming agent, coloring agent, resin powder, metal powder, for example, copper powder, nickel powder, brass powder, and aluminum powder, which are effective for enhancing heat-reflectance on the surface of the sheet and for preventing heat transfer through the sheet.

The stainproof surface layer usable for the present invention contains at least one stainproof and weathering-resistant synthetic thermoplastic polymeric material. The polymeric material is preferably selected from fluorine-containing polymers and polyacrylic polymers.

The fluorine-containing polymers can be selected from polymers of ethylene substituted with at least one fluorine atom, for example, polytetrafluoroethylene. The fluorine-containing polymer may contain chlorine atom, for example, may be polyfluorochloroethylene polymers, for example, polytrifluorochloroethylene. The fluorine-containing polymers include polyvinyl fluoride, polyvinylidene fluoride, and polydichlorodifluoroethylene. The above-mentioned fluorine-containing polymers have a high melting point and à low processability, for example, a poor calendering property. Therefore, the fluorine-containing polymer materials are usually shaped into a film by melting the polymer, and then extruding melt through a film-forming T-die or by heat-pressing a polymer powder in a mold. However, the shaping process for the fluorine-containing polymer is not limited to those described above.

The film of the fluorine-containing polymer usable for the present invention usually has a thickness in the range of from 0.001 mm to 0.5 mm, preferably, from 5 to 50 μm. The thickness of the film is, however, not limited to the above-mentioned value as long as the film is effective to attain the high weathering resistance, stain-resistance, and durability of the resultant composite sheet.

The fluorine-containing polymer film may contain an additional polymeric component, for example, polymethylmethacrylate, blended therewith. Also, the fluorine-containing polymer film may be laminated with another film, for example, polymethyl methacrylate film, as long as the purpose of the present invention can be accomplished.

The stainproof surface layer usable for the present invention can be formed by a polyacrylic resin. The polyacrylic resin is easily formed into a film of means of a T-die inflation or other conventional film-forming method. The polyacrylic resin film may be an undrawn film or a drawn fiber having an ultimate elongation of from 100% to 300%. The drawn or undrawn polyacrylic film may have a thickness of from 5 to 50 μm and is not limited to the above-mentioned range of thickness.

The polyacrylic resin for the stainproof surface layer includes polyalkyl methacrylate resins, for example, homopolymers of methyl methacrylate, ethyl methacrylate, propyl methacrylate, and butyl methacrylate, and copolymers of two or more of the above-mentioned methacrylate monomers and of one or more of the above-mentioned methacrylate monomers with at least one selected from alkyl acrylate, vinyl acetate, vinyl chloride, styrene, acrylonitrile, and methacrylonitrile.

The stainproof surface layer of the present invention is produced by laminating a film of the fluorine-containing polymer or the acrylic polymer or by coating a solution or emulsion of the above-mentioned polymer on a surface of the silicone polymer layer and solidifying the resultant solution or emulsion layer.

The resultant stainproof surface layer preferably exhibits a tensile strength of 100 kg/m$^2$ or more and has a weight of from 1 to 50 g/m$^2$, more preferably from 3 to 30 g/m², and a thickness of 5 μm or more, more preferably 10 to 50 μm, still more preferably 15 to 30 μm.

The stainproof surface layer usable for the present invention may be a two-layer laminate of a polyvinylidene fluoride resin layer with a polyacrylic resin polymer or a three-layer laminate of a polyvinylidene fluoride resin layer with a polyacrylic resin layer and a polyvinyl chloride resin layer. In the above-mentioned laminates, it is preferable that the polyvinylidene fluoride resin layer have a thickness of from 2 to 3 μm, the polyacrylic resin layer 2 to 4 μm, and the polyvinyl chloride resin layer 40 to 45 μm.

The stainproof surface layer can be adhered to the silicone polymer layer with or without an adhesive material. The adhesive materials usable for this purpose include melamine-formaldehyde resin adhesives, phenol-formaldehyde resin adhesives, epoxy compound adhesives, polyester resin adhesives, polyethyleneimine resin adhesives, polyisocyanate resin adhesives, polyurethane resin adhesives, acrylic resin adhesives, polyamide resin adhesives, vinyl acetate-vinyl chloride copolymer adhesives, and vinyl acetate-ethylene copolymer adhesives. Preferable adhesive materials include the epoxy compounds, polyethyleneimine resins, polyisocyanate resins, polyurethane resins, and acrylic resin adhesives.

If the surface position of the stainproof surface layer exhibits a poor affinity to the adhesive material, the surface portion may be modified by applying thereto an electrical discharge treatment at appropriate conditions, for example, under a voltage of 100 to 200 volts, at a static capacity of 40 to 100 μF, and at a short circuit current of 1 to 2 A. The thus modified surface portion of the stainproof surface layer exhibits an enhanced affinity to the adhesive material. The modification of the surface portion is preferably applied to the fluorine-containing polymer resin surface layer. The modification can be effected by other treatments than the above-mentioned discharge treatment.

In the composite sheet material of the present invention, the silicone polymer layer may be formed on a surface of a substrate consisting of a fibrous fabric.

Figure 2:
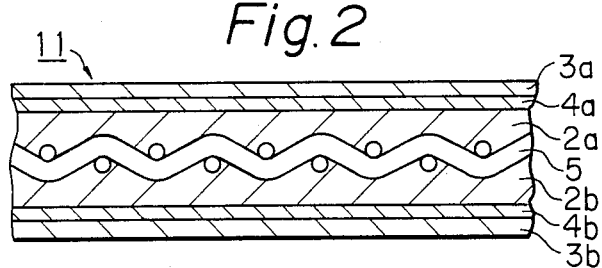
FIG. 2 is an explanatory cross-sectional profile of another embodiment of the composite sheet material of the present invention.

Referring to FIG. 2, a composite sheet material is composed of a fibrous fabric substrate 5, two silicone polymer layers 2a and 2b formed on both the surfaces of the substrate 5, two adhesive material layers 4a and 4b applied onto the silicone polymer layers 2a and 2b, and two stainproof surface layers 3a and 3b adhered to the silicone polymer layers 2a and 2b through the adhesive material layers 4a and 4b, respectively.

The fibrous fabric usable for the substrate can be selected from those made from at least one type of fiber selected from material fibers, for example, cotton, hemp, and flax; inorganic fibers, for example, ceramic fibers, silica fibers, carbon fibers, glass fibers, asbestos, and metallic fibers; regenerated fibers, for example, viscose rayon and cupra; semisynthetic fibers, for example, cellulose di- and tri-acetate fibers; and synthetic fibers, for example, nylon 6 fibers, nylon 66 fibers, polyester (polyethylene terephthalate) fibers, aromatic polyamide fibers, polyacronitrile fibers, polyvinyl chloride fibers, polyolefin fibers, and water-insolubilized polyvinyl alcohol fibers.

The fibrous fabric may be a woven or limited fabric made from staple fiber-spun yarns, multifilament yarns, monofilament years, split yarns and/or tape yarns, or a nonwoven fabric.

Preferably, the fibrous fabric is a woven fabric made from polyester multifilament yarns and/or glass fiber yarns. The woven fabric is not limited to any specific structure. However, it is preferable that the woven fabric be a plain weave.

The fibrous fabric substrate is highly effective for imparting a high mechanical strength and dimensional stability to the resultant composite sheet material.

In the case where the composite sheet material containing a fibrous fabric substrate is required to exhibit a high fire or heat resistance, the fibrous fabric substrate is made from incombustible inorganic fibers, for example, glass fibers, asbestos fibers, metallic fibers, and/or fire-retardant or heat resistant fibers, for example, polyester fibers, aromatic polyamide fibers, and/or wholly aromatic polyester fibers.

When the substrate consists of incombustible inorganic fiber woven, knitted or nonwoven fabric, it is preferable that the substrate exhibit a weight decrease in combustion of 1.5% or less and a cloth cover factor of 25 to 35 the enhance the adhesive property thereof to the silicone polymer layer, the softness, and the waterproof property thereof.

Also, it is preferable that the inorganic fiber substrate have a tensile strength of 50 kg/25 mm or more, more preferably 200 kg/25 mm or more, in warp and weft directions and a weight of 100 kg/m² or more, more preferably 200 to 900 g/m².

The most preferable inorganic fiber substrate is made from glass fibers.

The fire-retardant or heat resistant organic fibers are preferably selection from organic fibers having a melting point or heat decomposing point of 300° C. or more. The fire-retardant or heat resistant organic fibers include polymethabenzamide fibers, polyethaphenyleneisophthalamide fibers, copolymerized aromatic polyamide fibers, polythiazole fibers, polyoxadiazole fibers, polytriazole fibers, oxadiazoleamide copolymer fibers, polybenzimidazophenanthroline fibers, polybenzimidazole fibers, polyamideimide fibers, aromatic polyimide fibers, poly-p-phenylene terephthalamide fibers, polybenzamide fibers, and polyamide hydrazide fibers.

Preferably, the heat-resistant fibers are selected from poly-m-phenylene isophthalamide fibers and poly-p-phenylene terephthalamide fibers.

The fire-retardant or heat-resistant organic fibers may be blended with the incombustible inorganic fibers. In this blend, the organic fibers are preferably in a content of 70% by weight or less, more preferably 50% by weight or less.

In some types of composite sheet materials of the present invention, the substrate may consist of the fire-retardant or heat resistant organic fibers alone or a blend of the fire-retardant or heat-resistant organic fibers with usual organic fibers.

In the case where the composite sheet material containing a fibrous fabric substrate is required to exhibit a high fire resistance or heat resistance, an easy sewing property, and a high flex resistance, it is preferable that the incombustible inorganic fibers and the organic fibers, more preferably the fire-resistant or heat-resistant organic fibers are blended in a weight ratio of from 10:90 to 90:10. It is more preferable that the organic fibers contain the fire-retardant or heat-resistant organic fibers in an amount of 25% by weight or more, still more preferably 30% by weight or more, further preferably 50% by weight or more.

In the production of the composite sheet material of the present invention, at least one surface of the fibrous fabric substrate is coated with a coating liquid containing a silicone resin, at least one additive, and optionally a solvent, for example, toluene, xylene, or trichloroethylene, by means of dipping, spraying, roll-coating, reverse roll-coating, or knife coating. The coated coating liquid layer is solidified by heating at a temperature of 150° C. to 200° C. for 1 to 30 minutes.

The fibrous fabric substrate can be bonded to the silicone polymer layer by using an adhesive material.

In the composite sheet material of the present invention, a surface portion of the silicone polymer layer to be adhered to the stainproof surface layer is preferably modified by appling a cold plasma treatment or corona discharge treatment to the surface portion, to enhance the adhesion of the surface portion of the silicone polymer layer to the stainproof surface layer or an adhesive material.

Figure 3:
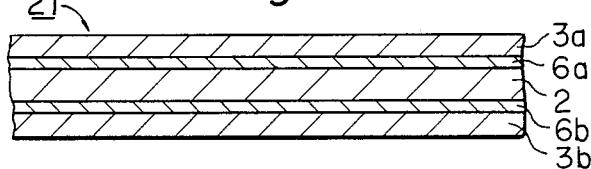
FIG. 3 is an explanatory cross-sectional profile of still another embodiment of the composite sheet material of the present invention.

Referring to FIG. 3, a composite sheet material 21 is composed of a silicone polymer layer 2, two surface portions 6a and 6b modified by cold plasma or corona discharge treatment, and two stainproof surface layers 3a and 3b. The two surfaces of the silicone polymer layer 2 adhere to the stainproof surface layers 3a and 3b through the modified surface portions 6a and 6b, respectively.

The modified surface portions of the silicone polymer layer may be adhered to the stainproof surface layers with or without an adhesive material.

Figure 4:
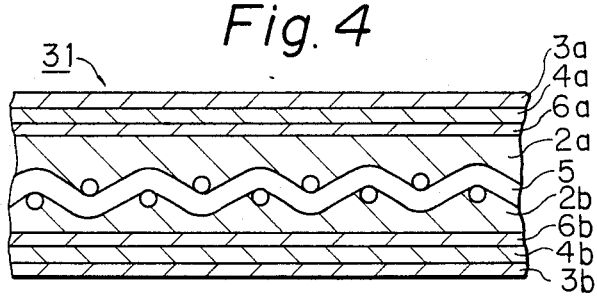
FIG. 4 is an explanatory cross-sectional profile of a further embodiment of the composite sheet material of the present invention.

Referring to FIG. 4, a composite sheet material 31 is composed of a fibrous fabric substrate 5, two silicone polymer layers 2a and 2b, two surface portions 6a and 6b modified by means of cold plasma or corona discharge treatment, two adhesive material layers 4a and 4b, and two stainproof surface layers 3a and 3b. The modified surface portions 6a and 6b of the silicone polymer layers 2a and 2b are adhered to the stainproof surface layers 3a and 3b through the adhesive material layers 4a and 4b, respectively. The adhesive material is the same as that mentioned hereinbefore.

The cold plasma treatment can be carried out by generating a cold plasma of a nonpolymerizable gas under a pressure of from 0.01 to 10 Torr and by exposing the surface portion of the silicone polymer layer to the cold plasma. The generation of the cold plasma can be effected by applying electric power of 10 to 500 W at a frequency of 13.56 MHz. The electrical discharge may be a polarized or nonpolarized discharge. The cold plasma treatment is applied for a time period of one second to several tens of minutes, variable depending on the applied voltage.

The cold plasma usable for the present invention can be effected by using low frequency waves, high frequency waves, microwaves, or direct current. Also, the cold plasma can be generated by means of glow discharge, corona discharge, spark discharge, or silent discharge. The electrodes for the cold discharge generation can be selected from any conventional electrodes. When the cold plasma is generated by using radiowaves, the plasma may be an induction or capacity connection plasma.

However, it is important that the application of the cold plasma does not result in overheating of the silicone polymer layer.

The nonpolymerizable gas preferably consists of at least one member selected from helium, neon, argon, nitrogen, nitrous oxide, nitrogen dioxide, oxygen, air, carbon monoxide, carbon dioxide, and hydrogen.

The cold plasma-modified surface portion of the silicone polymer layer is firmly bonded with the remaining portion thereof and exhibits and enhanced adhesion property.

The surface portion of the silicone polymer layer may be modified by means of corona discharge treatment to enhance the adhesive activity of the silicone polymer layer.

Preferably, the corona discharge treatment is continuously carried out by moving a precursory sheet material having a silicone polymer layer on an electrode roller and by applying a high voltage between the electrode roller and another electrode facing the electrode roller.

Figure 5:
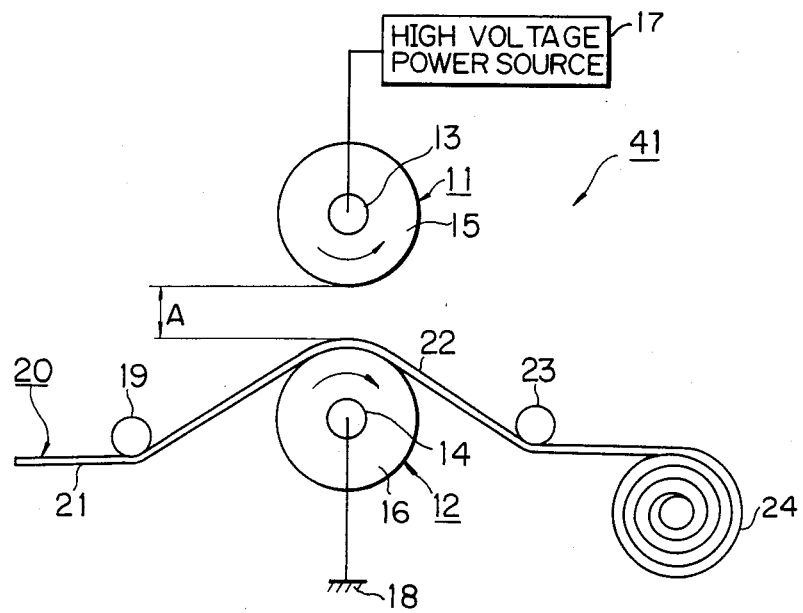
FIG. 5 is an explanatory view of an apparatus for applying a corona discharge treatment to a silicone polymer layer.

Referring to FIG. 5, a corona discharge treatment apparatus 41 has a pair of discharge electrodes 11 and 12 facing each other and spaced a distance A from each other. The upper electrode 11 has a metallic electrode core 13 connected to a high voltage power source 17 and a coating layer 15 covering the core 13 and consisting of an electrical nonconductive polymer material, for example, nonconductive rubber. The lower electrode 12 has a metallic electrode core 14 connected to the ground and coating layer 16 covering the core 14 and consisting of an electrical nonconductive polymer material, for example, nonconductive rubber.

A precursory sheet material 20 having a silicone polymer layer 22 is supplied into the apparatus 41 through a guide roll 19 in such a manner that the lower surface 21 of the precursory sheet material 20 comes into contact with the peripheral surface of the lower electrode 12. The sheet material 20 is moved by rotating the lower electrode 12 in the direction indicated by an arrow in the drawing and is wound into a roll 24 through a guide roll 23. While the lower electrode 12 is rotated, the upper electrode 11 is also rotated and a voltage of 100 to 200 volts is applied between the upper and lower electrodes 11 and 12 to generate a corona discharge of 10 to 60 A. The surface portion of the silicone polymer layer 22 is modified by the corona discharge to enhance the adhesion property thereof.

The distance A between the upper and lower electrodes 11 and 12 is usually 30 mm or less, preferably, from 5 to 20 mm.

The corona discharge apparatus may be of a spark gap type, vacuum tube type, or solid state type.

The corona discharge treatment is applied to the silicone polymer layer surface portion to an extent such that the modified surface portion exhibits a critical surface tension of 35 to 60 dyne/cm at which the surface exhibits an enhanced adhesion. For the purpose of obtaining the above-mentioned critical surface tension, it is preferable to impart an treatment energy of 5 to 50,000 W/m$^2$/min, more preferably, 150 to 40,000 W/m$^2$/min. The value of energy (voltage, current, distance A) to be applied to the silicone polymer layer is determined in consideration of the width of the sheet material and the treatment speed. For example, when the corona discharge treatment is applied to a sheet material having a width of 2 m at a speed of 10 m/min, the output (consumed electric power) to be applied is preferably in the range of 4 kW to 800 kW.

The corona discharge treatment for the present invention may be carried out by using conventional metallic electrodes.

The modified surface portion of the silicone polymer layer is firmly supported by the remaining portion of the silicone polymer layer and exhibits an enhanced adhesion property.

The modified surface portion of the silicone polymer layer produced by means of the cold plasma or corona discharge treatment can be bonded to the stainproof surface layer with or without the adhesive material as described hereinabove.

In the composite sheet material of the present invention, when the surface portion of the silicone polymer layer is modified by means of cold plasma treatment or corona discharge treatment, the modified surfaced portion is preferably further modified by applying thereto a graft polymerization procedure with at least one monomer selected from the group consisting of acrylic acid, acrylamide, and ethylene imine, to form a graft polymer layer and to further enhance the adhesion property of the silicone polymer layer.

The graft polymerization is carried out by bringing the modified surface portion of the silicone polymer layer into contact with a vapor consisting of at least one monomer selected from acrylic acid, acrylamide, and ethyleneimine at a temperature of 20° C. to 100° C. for the time period necessary to obtain the graft polymer layer having a desired thickness of, preferably, 0.05 to 5 $\mu$m.

The graft polymer layer is firmly bonded to the modified surface portion of the silicone polymer layer and exhibits an excellent adhesion property.

The silicone polymer layer having the modified surface portion thereof and the graft polymer layer bonded the modified surface portion can be firmly bonded to the stainproof surface layer with or without the adhesive material as described hereinabove.

Figure 6:
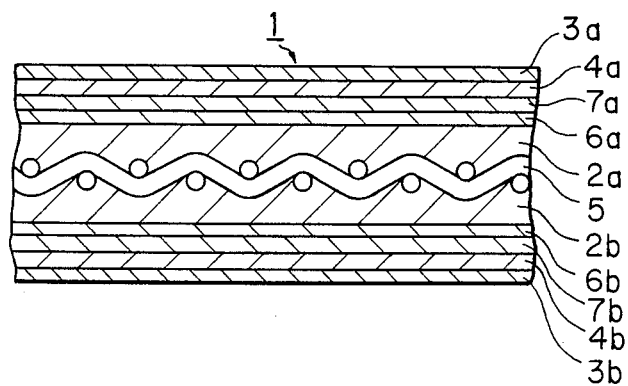
FIG. 6 is an explanatory cross-sectional profile of a still further embodiment of the composite sheet material of the present invention.

Referring to FIG. 6, a composite sheet material 51 is composed of a fibrous fabric substrate 5, two silicone polymer layers 2a and 2b having modified surface portions 6a and 6b, two graft-polymer layers 7a and 7b formed on the modified surface portions 6a and 6b, respectively, two adhesive material layers 4a and 4b, and two stainproof surface layers 3a and 3b.

The composite sheet material of the present invention is provided with a fire-resistant silicone polymer layer and a stainproof thermoplastic resin surface layer and, therefore, exhibits a high stainproof property, fire-retardant property or fire-resistance, and weathering resistance.

When the composite sheet material of the present invention is exposed to an elevated temperature, the sheet material is highly resistive to exothermic reaction, combustion, and smoke generation. Therefore, the composition sheet material of the present invention is useful in various fields, for example, as a material for the construction and/or interior of warehouses, gymnasiums, markets, recreation rooms, factories, garages, and hotels, which suffer from high risks of fire, and as a material for tents, sunshades, blinds, sheets, and partitions.

SPECIFIC EXAMPLES

The present invention will be further illustrated by the following examples, which are representative and do not restrict the scope of the present invention in any way.

EXAMPLE 1

A bleached cotton plain weave fabric having a weight of 200 g/m² and the following structure:

$$\frac{16 \text{ s/l} \times 16 \text{ s/l}}{75 \text{ yarns}/25.4 \text{ mm} \times 60 \text{ yarns}/25.4 \text{ mm}}$$

was used as a substrate.

A surface of the substrate was coated with 90 g/m² of a mixture of 10 parts by weight of a RTV silicone rubber (made by Toshiba Silicone Co.) with 1 part of a hardening agent by using a knife coater. The silicone rubber-coated substrate was heat-pressed between a heating cylinder heated at a temperature of 140° C. and a pressing roll under a pressure of 10 kg/cm and heated on the heating cylinder for 45 seconds to harden the silicone rubber layer. The surface of the silicone rubber layer was top-coated with 10 g/m² of the same mixture as mentioned above. The top-coated sheet material was heat-treated at a temperature of 180° C.

The resultant precursory sheet was coated with 20 g/m² of a polyacrylic resin adhesive agent (available under a trademark SC-462, made by Sony Chemical Co.) and was dried at room temperature.

A polyvinylidene fluoride film having a thickness of 3 $\mu$m was placed on the adhesive material layer of the precursory sheet and was heat-pressed.

The resultant composite sheet material exhibited a satisfactory stainproof property in a stainproof test in accordance with JIS L-1021(1979) and JIS L-0805(1983).

Also, the resultant composite sheet material exhibited an enhanced weathering resistance determined in accordance with JIS Z-2381(1979).

Furthermore, the composite sheet exhibited a peeling strength between the silicone polymer layer and the stainproof surface layer of 1.2 kg/3 cm.

COMPARATIVE EXAMPLE 1

The same procedures as those described in Example 1 were carried out except that no polyvinylidene fluoride film was used.

The resultant sheet exhibited an unsatisfactory stainproof property.

EXAMPLE 2

The same procedures as those described in Example 1 were carried out except that the polyvinylidene fluoride film was replaced by a polymethylmethacrylate film having a thickness of 30 $\mu$m. This film was bonded to the silicone rubber layer with an epoxy adhesive material.

The resultant composite sheet exhibited a satisfactory stainproof property and weathering resistance. Also, the composite sheet exhibited a peeling strength between the silicone polymer layer and the stainproof surface layer of 1.4 kg/3 cm.

EXAMPLE 3

The same procedures as those described in Example 1 were carried out except that the polyvinylidene fluoride film was replaced by a laminate film consisting of a polyvinylidene fluoride layer having a thickness of 2 $\mu$m, a polyacrylic resin layer having a thickness of 2 to 4 $\mu$m, and a polyvinyl chloride layer having a thickness of 45 $\mu$m, which film was available under a trademark of KFC film and was made by Kureha Chemical Co.

The resultant composite sheet exhibited a satisfactory stainproof property and weathering resistance. Also, the composite sheet exhibited a peeling strength of the stainproof surface layer from the silicone polymer layer of 1.3 kg/3 cm.

EXAMPLE 4

A silicone polymer sheet was prepared by casting the same silicone rubber mixture as that described in Example 1 in a thickness of 0.5 $\mu$m on a release paper, by hardening the casted layer and by removing the hardened layer from the release paper.

A surface of the resultant silicone polymer sheet was coated with 25 g/m$^2$ of an adhesive material consisting of 100 parts by weight of polyurethane adhesive (containing 35% by weight of solid component and available under a trademark of Nippolan 3022, made by Nippon Urethane Co.) and 15 parts by weight of a hardening agent (available under a trademark of Colonate 1-L, made by Nippon Urethane Co.), by using a 60 mesh gravure coater, and the coated adhesive material layer was dried.

The same KFC film as that described in Example 3 was placed on the dried adhesive material layer on the silicone polymer sheet and heat-pressed to provided a composite sheet.

The resultant composite sheet was subjected to a stainproof test in accordance with JIS L-1021(1979). The result of the stainproof test was evaluated in accordance with JIS I-0805(1983). As a result, the composite sheet exhibited a satisfactory stainproof property and weathering resistance. Also, the composite sheet exhibited a peeling strength of the stainproof surface layer from the silicone polymer layer of 2.4 kg/3 cm.

COMPARATIVE EXAMPLE 2

The same procedures as those described in Example 4 were carried out, except that no KFC film was used.

The silicone polymer sheet exhibited a poor stainproof property, and it was found that the stain particles were embedded in the silicone polymer sheet and the removed of the embedded particles was very difficult.

EXAMPLE 5

A fibrous fabric substrate consisted of a plain weave having the following structure was produced from aromatic polyamide multifilament yarns (available under the trademark of Kebler made by Du Pont):

$$\frac{195 \text{ d}/130 \text{ filaments} \times 195 \text{ d}/130 \text{ filaments}}{34 \text{ yarns}/25.4 \text{ mm} \times 34 \text{ yarns}/25.4 \text{ mm}}$$

The fabric had a weight of 60 g/m$^2$ and warp and weft tensile strengths of 149 kg/3 cm.

The two surfaces of the fabric were coated with a coating liquid having the following composition.

| | |
|---|---|
| Silicone resin liquid (*) (available under the trademark of TSR 1120 made by Toshiba Silicone Co.) | 100 parts by weight |
| Hardening agent | 2 parts |
| Potassium titanate (available under the trademark of Tismo D$_1$ made by Otsuka Chemical Co.) | 100 parts |

The coated layer was air-dried for 5 minutes and then heat-treated at a temperature of 200° C. for 5 minutes. The resultant solid layer had a thickness of about 0.1 mm.

The resultant silicon polymer surface was coated with 30 g/m$^2$ of an adhesive material (available under a trademark of SC-462, made by Sony Chemical Co.).

A stainproof resin film consisting of a polyvinylidene fluoride layer having a thickness of 2 to 3 $\mu$m and a polyacrylic resin layer having a thickness of 45 $\mu$m, which film was available under a trademark of KFC sheet and was made by Kureha Chemical Industry Co., was bonded to the silicone polymer layer through the adhesive material layer in such a manner that the polyvinylidene fluoride layer formed a surface layer of the resultant composite sheet material, at an elevated temperature.

The resultant composite sheet material was subjected to a heat resistance test in accordance with JIS A-1323(1984). A stainproof test in accordance with JIS L1021(1979), a weathering test in accordance with JIS Z-2381(1979), and a flex resistance test in accordance with JIS P8115 (1976).

As a result, the composite sheet material exhibited satisfactory heat resistance, stainproof property, weathering resistance, and flex resistance.

EXAMPLE 6

The same procedures as those described in Example 5 were carried out, except that the fibrous fabric substrate consisted of a plain weave made of aromatic polyamide fiber-spun yarns (available under a trademark of Conex made by Teijin) and having the following structure:

$$\frac{30 \text{ s}/1 \times 30 \text{ s}/1}{60 \text{ yarns}/25.4 \text{ mm} \times 54 \text{ yarns}/25.4 \text{ mm}}$$

The fabric had a weight of 90 g/m$^2$ and an average tensile strength of 66 kg/3 cm.

The resultant composite sheet material exhibited satisfactory heat resistance, stainproof property, weathering resistance, and flex resistance.

EXAMPLE 7

The same procedures as those described in Example 5 were carried out, except that the fabric substrate was made frome glass fiber yarns in the following structure:

$$\frac{DE\ 150\ 1/2\ 3.3\ s}{55 \text{ yarns}/25.4 \text{ mm} \times 51 \text{ yarns}/25.4 \text{ mm}},$$

turkish satin. The substrate had a weight of 290 g/m$^2$.

The resultant composite sheet exhibited an excellent heat resistance and satisfactory stainproof property and weathering resistance.

EXAMPLE 8

The same procedures as those described in Example 5 were carried out, except that the fabric substrate was produced from polyester multifilament warp yarns and aromatic polyamide multifilament weft yarns and had the following structure.

$$\frac{1000\ d \times 1000\ d}{32 \text{ yarns}/25.4 \text{ mm} \times 32 \text{ yarns}/25.4 \text{ mm}} \text{ plain weave.}$$

The fabric substrate had a weight of 300 g/m$^2$ and a thickness of 0.35 mm.

A polyacrylic resin film having a thickness of 25 $\mu$m was bonded to the silicone polymer layer surface with an adhesive material.

The resultant composite sheet exhibited excellent heat resistance, stainproof property, and flex resistance.

EXAMPLE 9

The same procedures as those described in Example 1 were carried out with the following exception.

A surface of the precursory sheet was subjected to cold plasma treatment. The precursory sheet was placed in a cold plasma apparatus. The pressure in the apparatus was reduced to $10^{-5}$ Torr. Argon gas was introduced into the pressure reduced apparatus, and the pressure in the apparatus was adjusted to 0.2 Torr.

Cold plasma treatment was applied to the precursory sheet surface at a frequency of 13.56 MHz at a consumption power of 100 W for 30 minutes.

The resultant composite sheet exhibited a satisfactory stainproof property and an excellent peeling strength between the silicone polymer layer and the stainproof surface layer. In the peeling test, the stainproof surface layer was broken at a tensile load of 5.2 kg/3 cm without peeling from the silicone polymer layer.

EXAMPLE 10

The same procedures as those described in Example 2 were carried out, except that the same cold plasma treatment as that described in Example 9 was applied to a surface of the silicone polymer layer in the precursory sheet.

The resultant composite sheet exhibited an excellent stainproof property and weathering resistance. Also, when the composite sheet was subjected to a peeling test, the stainproof surface layer was interrupted at a load of 5.4 kg/3 cm without being peeled from the silicone polymer layer.

EXAMPLE 11

The same procedures as those described in Example 3 were carried out, except that the same cold plasma treatment as that described in Example 9 was applied to a surface of the silicone polymer layer of the precursory sheet.

The resultant composite sheet exhibited an excellent stainproof property and weathering resistance. Also, the peeling test applied to the stainproof surface layer and the silicone polymer layer resulted in breakage of the stainproof surface layer at a tensile load of 5.4 kg/3 cm without peeling.

EXAMPLE 12

The same procedures as those described in Example 4 were carried out, except that the silicone polymer sheet surface was modified by the same cold plasma treatment as that described in Example 9, except that argon gas was replaced by hydrogen gas, the pressure in the apparatus was adjusted to 0.01 Torr, and the consumption power was 500 W.

In the peeling test applied to the resultant composite sheet, the stainproof surface layer was broken at a tensile load of 5.2 kg/3 cm without peeling. Similar peeling test results were obtained 7 months after the production of the composite sheet.

EXAMPLE 13

The same procedures as those described in Example 9 were carried out, except that a surface of a polyvinylidene fluoride film having a thickness of 15 μm was modified by applying a corona discharge treatment thereto, and the modified surface of the polyvinylidene fluoride film was superimposed on the cold plasma-modified surface of the precursory sheet and was fuse-bonded thereto.

It was found that in the peeling test, the stainproof surface layer in the resultant composite sheet was broken at a tensile load of 5.3 kg/3 cm without peeling.

The resultant composite sheet exhibited a high stainproof property and weathering resistance.

EXAMPLE 14

Both surfaces of a glass fiber plain fabric having a thickness of 0.25 mm was coated by means of a knife coater with an addition reaction type hardening silicone rubber having the following composition:

| Component | Parts by weight |
| --- | --- |
| Dimethylpolysiloxane (in which both terminals were modified with vinyl radicals and which has a viscosity of 10,000 CS) | 100 |
| Methylhydrogen polysiloxane having a viscosity of 40 CS | 1.0 |
| Benzotriazol (Addition reaction-retardant) | 0.11 |
| Carbon black | 1.0 |
| Aluminum hydroxide powder | 50 |
| Platinum compound catalyst | — |

The silicone rubber was in the form of a light grey paste.

The coated silicone rubber layer was vulcanized at a temperature of 170° C. for five minutes. The resultant silicone rubber layer had a thickness of 0.1 mm. The silicone rubber layer with stood a UL94V-0 test at a thickness of 0.16 mm thereof.

The resultant precursory sheet was subjected to the same cold plasma treatment as that described in Example 9.

The cold plasma-treated precursory sheet was coated in the same manner as that described in Example 9.

The resultant composite sheet exhibited an enhanced stainproof property, weathering resistance, and fire resistance. In the peeling test, the stainproof layer was broken at a tensile load of 5.5 kg/3 cm without peeling from the silicone polymer layer.

EXAMPLE 15

The same procedures as those described in Example 14 were carried out, except that the stainproof surface layer was formed from a polyacrylic resin film having a thickness of 30 μm.

The resultant composite sheet exhibited an enhanced fire resistance and stainproof property. In the peeling test, the stainproof layer was broken at a tensile load of 5.5 kg/3 cm without peeling from the silicone polymer layer.

EXAMPLE 16

The same procedures as those of Example 14 were carried out, except that the same KFC film as that described in Example 3 was used in place of the polyacrylic resin film.

The resultant composite sheet exhibited an enhanced stainproof property and weathering resistance. In the peeling test, the stainproof surface layer was broken at a tensile load of 5.2 kg/3 cm without peeling.

EXAMPLE 17

A silicone rubber mixture was prepared from 100 parts by weight of a dimethylsiloxane (0.14)-methylvinylsiloxane (99.86) copolymer and 40 parts by weight of hydrophobic fumed silica. The silicone rubber mixture was mixed with chloroplatinic acid (in an amount of 30 ppm in the term of platinum), 40 parts by weight of aluminum hydroxide powder, 10 parts by weight of mica powder, and 1.5 parts by weight of dicumyl peroxide.

The resultant mixture was coated on both surfaces of a glass fiber fabric having a thickness of 0.6 mm to form silicone rubber layers.

The coated silicone rubber layers were vulcanized at 200° C. for 5 minutes. The resultant silicone rubber layers had a thickness of 0.6 mm and passed a UL94V-0 test in a thickness of 0.16 mm thereof.

The resultant laminate was subjected to the same cold plasma treatment as that mentioned in Example 12. The cold plasma-modified surface of the silicone rubber layer was coated in the same manner as that mentioned in Example 4.

The resultant composite sheet exhibited an enhanced weathering resistance, and stainproof property. In the peeling test, the stainproof surface layer was broken at a tensile load of 5.4 kg/3 cm before peeling.

EXAMPLE 18

The same procedures as those described in Example 14 were carried out, except that a surface of a polyvinylidene fluoride film having a thickness of 15 μm was corona discharge treated in the same manner as that described in Example 13 and the surface-modified polyvinylidene fluoride film was coated on the cold plasma-modified surface of the precursory sheet in the same manner as Example 13.

The resultant composite sheet had an enhanced stainproof property and weathering resistance. In the peeling test, the stainproof surface layer was broken under a tensile load of 5.4 kg/3 cm without peeling.

EXAMPLE 19

The same precursory sheet as that described in Example 14 was subjected to a corona discharge treatment by using the apparatus as shown in Example 5.

The precursory sheet was fed at a feeding speed of 10 m/min onto the peripheral surface of the lower electrode roll. The distance A between the upper and lower electrodes was 10 mm and a voltage of 160 V was applied between the electrodes. A corona discharge treatment was continuously applied onto the surface of the silicone rubber layer at a current of 18 A at a maximum output of 8 kW (consumption power=7.9 kW/hr).

In the upper and lower electrodes, the metallic cores had a diameter of 20 cm and the thickness of the non-conductive resin layer was 2 mm. That is, each electrode roll had a diameter of 20.4 cm, a length of 2 m, and discharge width of 1.92 m.

In the above-mentioned corona discharge treatment, the energy applied to the silicone rubber surface was approximately 440 W/m$^2$/min.

The corona discharge-modified precursory sheet was subjected to the same coating procedures as those described in Example 14.

The resultant composite sheet exhibited an enhanced stainproof property, weathering resistance, and fire resistance. In the peeling test, the stainproof surface layer was broken under a tensile load of 4.2 kg/3 cm without peeling.

EXAMPLE 20

The same precursory sheet as that mentioned in Example 17 was subjected to the same corona discharge treatment as that described in Example 19.

The corona discharge-modified precursory sheet was coated by the same KFC film in the same manner as those mentioned in Example 17.

The resultant composite sheet exhibited an enhanced stainproof property, weathering resistance, and fire resistance. In the peeling test, the stainproof surface layer was broken under a tensile load of 4.4 kg/3 cm without peeling.

EXAMPLE 21

The same procedures as those described in Example 18 were carried out, except that the cold plasma treatment was replaced by the same corona discharge treatment as that mentioned in Example 19.

The resultant composite sheet exhibited an enhanced stainproof property, weathering resistance, and fire resistance. In the peeling test, the stainproof surface layer was broken under a tensile load of 4.8 kg/3 cm without peeling.

EXAMPLE 22

The same procedures as those described in Example 9 were carried out, except that the surface portion of the silicone rubber layer in the precursory sheet was modified by means of a corona discharge treatment in the same manner as that described in Example 19.

The resultant composite sheet exhibited an enhanced weathering resistance and stainproof property. In the peeling test, the stainproof surface layer was broken under a tensile load of 4.4 kg/3 cm before it was peeled from the silicone rubber layer.

EXAMPLE 23

The same procedures as those described in Example 11 were carried out, except that the cold plasma treatment was replaced by the same corona discharge treatment as described in Example 19.

The resultant composite sheet exhibited an enhanced weathering resistance and stainproof property. In the peeling test, the stainproof surface layer was broken under a tensile load of 4.2 kg/3 cm before it was peeled from the silicone rubber layer.

EXAMPLE 24

The same procedures as those described in Example 12 were carried out, except that the cold plasma treatment was replaced by the same corona discharge treatment as that described in Example 19.

The resultant composite sheet exhibited an enhanced stainproof property, weathering resistance, and fire-retardant property. In the peeling test, the stainproof surface layer was broken under a tensile load of 4.6 kg/3 cm before it was peeled from the silicone polymer layer.

EXAMPLE 25

The same procedures as those described in Example 22 were carried out, except that the stainproof surface layer was formed in the same manner as that described in Example 18.

The resultant composite sheet exhibited an enhanced stainproof property and weathering resistance. In the peeling test, the stainproof surface layer was broken under a tensile load of 4.4 kg/3 cm before it was peeled from the silicone polymer layer.

EXAMPLE 26

The same procedures as those described in Example 14 were carried out, except that the cold plasma-modified surface portion of the precursory sheet was subjected to graft polymerization as follows.

The cold plasma-modified surface portion of the precursory sheet was exposed to acrylic acid vapor, which was generated at room temperature, at a temperature of 60° C. for 5 minutes. A polyacrylic acid layer having a thickness of 1.5 µm was grafted upon the surface of the cold plasma-modified surface of the silicone polymer layer.

The resultant composite sheet exhibited an enhanced weathering resistance, stainproof property, and fire resistance. In the peeling test the stainproof surface layer (polyvinylidene fluoride film) was broken under a tensile load of 6.8 kg/3 cm before it was peeled from the silicone polymer layer.

EXAMPLE 27

The same procedures as those described in Example 17 were carried out, except that the cold plasma-modified surface portion of the silicone rubber layer was brought into contact with acrylamide vapor at a temperature of 60° C. for 3 minutes. The resultant polyacrylamide layer having a thickness of 1.8 µm was grafted upon the modified surface of the silicone rubber layer.

The resultant composite sheet exhibited an enhanced weathering resistance, stainproof property, and fire resistance. In the peeling test, the stainproof surface layer (KFC film) was broken under a tensile load of 6.5 kg/3 cm before it was peeled from the silicone rubber layer.

EXAMPLE 28

The same procedures as those described in Example 26 were carried out, except that the same corona discharge-treated polyvinylidene fluoride film as that described in Example 13 was used in place of the polyvinylidene fluoride film.

The resultant composite sheet exhibited an enhanced stainproof property, weathering resistance, and fire-resistance. In the peeling test, the stainproof surface layer (modified polyvinylidene fluoride film) was broken under a tensile load of 6.8 kg/3 cm before it was peeled from the silicone polymer layer.

EXAMPLE 29

The same procedures as those described in Example 9 were carried out, except that the cold plasma-modified surface portion of the silicone rubber layer in the precursory sheet was subjected to graft polymerization procedures as follows.

The modified surface portion was brought into contact with acrylic acid vapor, which was generated at room temperature, at a temperature of 60° C. for 5 minutes. A polyacrylic acid layer having a thickness of 1.5 µm was grafted to the cold plasma-modified surface portion of the silicone rubber layer.

The resultant composite sheet exhibited an enhanced weathering resistance and stainproof property. In the peeling test, the stainproof surface layer (polyvinylidene flucoride film) was broken at a load of 6.6 kg/3 cm before it was peeled from the silicone rubber layer.

EXAMPLE 30

The same procedures as those described in Example 29 were carried out, except that the stainproof surface layer was formed by a polyacrylic resin film having a thickness of 30 µm.

The resultant composite sheet exhibited an enhanced stainproof property and weathering resistance. In the peeling test, the stainproof surface layer was broken at a load of 6.6 kg/3 cm before it was peeled from the silicone rubber layer.

EXAMPLE 31

The same procedures as those described in Example 12 were carried out, except that the cold plasma-modified surface portion of the silicone rubber layer in the precursory sheet was subjected to a graft polymerization procedure with acrylamide vapor at a temperature of 60° C. for 3 minutes.

The resultant polyacrylic amide layer grafted to the modified surface portion of the silicone rubber layer had a thickness of 1.8 µm.

The resultant composite sheet exhibited an exhanced stainproof property and weathering resistance. In the peeling test, the stainproof surface layer (KFC film) was broken at a load of 6.8 kg/3 cm before it was peeled from the silicone rubber layer.

EXAMPLE 32

The same procedures as those described in Example 13 were carried out, except that the cold plasma-modified surface portion was graft-polymerized with acrylic acid in the same manner as that mentioned in Example 29.

The resultant composite sheet exhibited an enhanced stainproof property and weathering resistance. In the peeling test, the stainproof surface layer (corona dischange-treated polyvenylidene fluoride film) was broken at a load of 6.8 kg/3 cm before it was peeled from the silicone rubber layer.

EXAMPLE 33

The same procedures as those described in Example 29 were carried out, except that acrylic acid was replaced by ethyleneimine and the resultant grafted polyethylenelayer had a thickness of 1.4 µm.

The resultant composite sheet exhibited an enhanced stainproof property and weathering resistance. In the peeling test, the stainproof surface layer (polyvinylidene fluoride film) was broken at a load of 6.8 kg/3 cm before it was peeled from the silicone rubber layer.

EXAMPLE 34

The same procedures as those described in Example 31 were carried out, except that acrylic acid was replaced with ethyleneimine and the resultant graft-polymerized ethyleneimine layer had a thickness of 2.0 µm.

The resultant composite sheet exhibited an improved stainproof property and weathering resistance. In the peeling test, the stainproof surface layer (KFC film) was broken at the load of 6.9 kg/3 cm without peeling from the silicone rubber layer.

EXAMPLE 35

The same procedures as those described in Example 26 was carried out except that acrylic acid was replaced by ethyleneimine and the resultant graft polymer layer had a thickness of 1.5 µm.

The resultant composite sheet exhibited a high fire resistance and enhanced weathering resistance and stainproof property. In the peeling test, the stainproof surface layer (polyvinylidene fluoride film) was broken at a load of 6.9 kg/3 cm without peeling from the silicone rubber layer.

EXAMPLE 36

The same procedures as those described in Example 27 were carried out, except that acrylamide was replaced by ethyleneimine and the resultant graft polymer layer had a thickness of 1.6 μm.

The resultant composite sheet exhibited an excellent fire resistance and an enhanced stainproof property and weathering resistnace. In the peeling test, the stainproof surface layer (KFC film) was broken at a load of 6.8 kg/3 cm without peeling from the silicone rubber layer.

EXAMPLE 37

The same procedures as those described in Example 28 were carried out, except that acrylic acid was replaced by ethyleneimine and the resultant graft polymer layer had a thickness of 1.4 μm.

The resultant composite sheet exhibited an enhanced stainproof property and weathering resistance. In the peeling test, the stainproof surface layer (corona discharge-modified polyvinylidene fluoride film) was broken at a load of 6.6 kg/3 cm without peeling from the silicone rubber layer.

EXAMPLE 38

The same procedures as those described in Example 22 were carried out except that the corona discharge-modified surface portion of the silicone rubber layer in the precursory sheet was brought into contact with acrylic acid vapor (which was prepared at room temperature) at a temperature of 60° C. for 5 minutes. The resultant graft polymer layer had a thickness of 1.5 μm.

The resultant composite sheet had a enchanced stainproof property and weathering resistance. In the peeling test, the stainproof surface layer (polyvinylidene fluoride film) was broken at a load of 6.2 kg/3 cm without peeling from the silicone rubber layer.

EXAMPLE 39

The same procedures as those described in Example 23 were carried out, except that the same graft polymerization procedures as those described in Example 38 were applied to the corona discharge-modified surface portion of the silicone rubber layer in the precursory sheet.

The resultant composite sheet exhibited an enhanced weathering resistance and stainproof property. In the peeling test, the stainproof surface layer (KFC film) was broken at a load of 6.0 kg/3 cm before it was peeled from the silicone rubber layer.

EXAMPLE 40

The same procedures as those described in Example 24 were carried out, except that the same graft polymerization procedures as those described in Example 31 were applied to the corona discharge-modified surface portion of the silicone rubber layer in the precursory sheet.

The resultant composite sheet exhibited an enhanced weathering resistance and stainproof property. In the peeling test, the stainproof surface layer (KFC film) was broken at a load of 6.0 kg/3 cm before it was peeled from the silicone rubber layer.

EXAMPLE 41

The same procedures as those described in Example 25 were carried out, except that the same graft polymerization procedures as those described in Example 38 were applied to the corona discharge-modified surface poriton of the silicone rubber layer in the precursory sheet.

The resultant composite sheet exhibited an enhanced weathering resistance and stainproof perperty. In the peeling test, the stainproof surface layer (KFC film) was broken at a load of 6.2 kg/3 cm before it was peeled from the silicone rubber layer.

EXAMPLE 42

The same procedures as those described in Example 19 were carried out, except that the same graft polymerization procedures as those described in Example 38 were applied to the corona discharge-modified surface portion of the silicone rubber layer in the precursory sheet. The resultant grafted polyacrylic acid layer had a thickness of 1.5 μm.

The resultant composite sheet exhibited an enhanced weathering resistance and stainproof property. In the peeling test, the stainproof surface layer (KFC film) was broken at a load of 6.4 kg/3 cm before it was peeled from the silicone rubber layer.

EXAMPLE 43

The same procedures as those described in Example 20 were carried out, except that the same grafted polymerization procedures as those described in Example 31 were applied to the corona discharge-modified surface portion of the silicone rubber layer in the precursory sheet. The resultant grafted polyacrylamide layer had a thickness of 1.8 μm.

The resultant composite sheet exhibited an enhanced weathering resistance and stainproof perperty. In the peeling test, the stainproof surface layer (KFC film) was broken at a load of 6.2 kg/3 cm before it was peeled from the silicone rubber layer.

EXAMPLE 44

The same procedures as those described in Example 43 were carried out, except that in the graft polymerization procedures, acrylamide was replaced by ethyleneimine and the resultant grafted polyethyleneimine layer had a thickness of 2.0 μm.

The resultant composite sheet exhibited an enhanced weathering resistance and stainproof property. In the peeling test, the stainproof surface layer (KFC film) was broken at a load of 6.4 kg/3 cm before it was peeled from the silicone rubber layer.

EXAMPLE 45

The same procedures as those described in Example 42 were carried out, except that the same stainproof surface layer as that mentioned as those described in Example 21 was produced.

The resultant composite sheet exhibited an enhanced weathering resistance and stainproof property. In the peeling test, the stainproof surface layer (KFC film) was broken at a load of 6.4 kg/3 cm before it was peeled from the silicone rubber layer.

We claim:

1. A composite sheet material comprising:

(a) at least one silicone polymer layer containing at least one member selected from the group consisting of silicone resins and silicone rubbers, and (b) at least one stainproof surface layer containing at least one synthetic thermoplastic polymeric material having high stain-resistance and weathering resistance, and characterized in that the silicone polymer layer has a surface portion thereof modified by means of a graft polymerization treatment with at least one member selected from the group consisting of acrylic acid, acrylamide, and ethylene imine and the silicone polymer layer is bonded to the stainproof surface layer at and through the resultant graft polymerization-modified surface portion.

2. The composite sheet material as claimed in claim 1, wherein the silicone resins are selected from the group consisting of organopolysiloxane resins, polyacryloxyalkylalkoxysilane resins, polyvinylsilane resins, and derivatives of the above-mentioned resins.

3. The composite sheet material as claimed in claim 1, wherein the silicone polymer layer consists of at least one member alone selected from the group consisting of silicone resins and silicone rubbers 4. The composite sheet material as claimed in claim 1, wherein the silicone polymer layer comprises a silicone matrix consisting of at least one member selected from the group consisting of silicone resins and silicone rubbers and at least one flame-retardant inorganic filler in an amount of 30% to 300% based on the weight of the silicone matrix.

5. The composite sheet material as claimed in claim 1, wherein the stainproof surface layer comprises at least one synthetic polymeric material selected from the group consisting of polyacrylic resin materials and fluorine-containing resin materials.

6. The composite sheet material as claimed in claim 1, wherein the stainproof surface layer comprises a laminate consisting of a polyvinylidene fluoride resin layer and a polyacrylic resin layer.

7. The composite sheet material as claimed in claim 1, wherein the stainproof surface layer comprises a laminate consisting of a polyvinylidene fluoride resin layer, a polyacrylic resin layer and a polyvinyl chloride resin layer.

8. The composite sheet material as claimed in claim 1, further comprising a substrate consisting of a fribrous fabric on which substrate the silicone polymer layer is formed.

9. The composite sheet material as claimed in claim 8, wherein the fibrous fabric contains flame-resistant fibers.

10. The composite sheet material as claimed in claim 9, wherein the flame-resistant fibers are inorganic fibers selected from the group consisting of asbestos fibers, ceramic fibers, silica fibers, glass fibers, carbon fibres, and metal fibers.

11. The composite sheet material as claimed in claim 9, wherein the flame-resistant fibers are organic fibers having a melting point or heat decomposition point of 300° C. or more.

12. The composite sheet material as claimed in claim 8, wherein the fibrous fabric consists of inorganic fibers and organic fibers.

13. The composite sheet material as claimed in claim 12, wherein the inorganic fibers and the organic fibers are in a weight ratio of 10:90 to 90:10.

14. The composite sheet material as claimed in claim 12, wherein the organic fibers contains at least 25% by weight of flame-resistant organic fibers having a melting point or heat decomposition point of 300° C. or more.

15. The composite sheet material as claimed in claim 1, wherein the graft polymerization-modified portion of the silicone polymer layer is further adhered to the stainproof surface layer with an adhesive material.

16. The composite sheet material as claimed in claim 15, wherein the adhesive material is selected from the group consisting of polyacrylic adhesive polymer materials, epoxy adhesive materials, polyethyleneimine adhesive materials, polyisocynate adhesive materials, and polyurethane adhesive materials.

17. the composite sheet material as claimed in claim 1, wherein the surface portion of the silicone polymer layer to be graft polymerization-modified has been preliminarily modified by applying thereto a cold plasma treatment.

18. The composite sheet material as claimed in claim 1, wherein the surface portion of the silicone polymer layer to be graft polymerization-modified has been preliminarily modified by applying thereto a corona discharge treatment.

19. A comopsite sheet material comprising:

(a) at least one silicone polymer layer containing at least one member selected from the group consisting of silicone resins and silicone rubbers, said silicon polymer layer having a surface portion thereof modified by means of a graft polymerization treatment with at least one member selected from the group consisting of acrylic acid, acrylamide, and ethylene imine; and (b) at least one stainproof surface layer containing at least one synthetic thermoplastic polymeric material having high stain-resistance and weathering resistance, whereby the silicone polymer layer is bonded to the stainproof surface layer through the resultant graft polymerization-modified surface portion.

20. A method of improving adhesion of a composite sheet material having at least one silicone polymer layer containing at least one member selected from the group consisting of silicone resins and silicone rubbers, to at least one stainproof surface layer containing at least one synthetic thermoplastic polymeric material having high stain-resistance and weathering resistance, said method of improving the composite sheet material characterized by:

modifying a surface portion of the silicon polymer layer through graft polymerization treatment with at least one member selected from the group consisting of acrylic acid, acrylamide, and ethylene imine and bonding the silicone polymer layer to the stainproof surface layer at the surface portion resulting from the graft polymerization.

* * * * *